United States Patent
Chien et al.

(10) Patent No.: US 9,693,379 B2
(45) Date of Patent: Jun. 27, 2017

(54) DIRECT MODE COMMUNICATION SYSTEM AND COMMUNICATION RESOURCE SCHEDULING METHOD THEREOF

(71) Applicant: Institute For Information Industry, Taipei (TW)

(72) Inventors: Chun-Che Chien, Taipei (TW); Yi-Hsueh Tsai, New Taipei (TW); Shiann-Tsong Sheu, Taipei (TW)

(73) Assignee: Institute For Information Industry, Taipei (TW)

( * ) Notice: Subject to any disclaimer, the term of this patent is extended or adjusted under 35 U.S.C. 154(b) by 174 days.

(21) Appl. No.: 14/643,797

(22) Filed: Mar. 10, 2015

(65) Prior Publication Data
US 2015/0264734 A1    Sep. 17, 2015

Related U.S. Application Data

(60) Provisional application No. 61/950,845, filed on Mar. 11, 2014.

(51) Int. Cl.
*H04W 72/00* (2009.01)
*H04W 76/02* (2009.01)
*H04W 4/00* (2009.01)
*H04W 72/12* (2009.01)
*H04W 88/06* (2009.01)
*H04W 72/04* (2009.01)

(52) U.S. Cl.
CPC ......... *H04W 76/023* (2013.01); *H04W 4/008* (2013.01); *H04W 72/1231* (2013.01); *H04W 72/04* (2013.01); *H04W 88/06* (2013.01)

(58) Field of Classification Search
CPC . H04W 76/023; H04W 24/10; H04W 72/042; H04W 92/18
USPC ....................................... 455/509, 450–452.2
See application file for complete search history.

(56) References Cited

U.S. PATENT DOCUMENTS

| 2009/0103558 | A1 | 4/2009 | Zangi et al. | |
| 2010/0093364 | A1* | 4/2010 | Ribeiro | H04W 72/082 455/452.2 |
| 2011/0022714 | A1* | 1/2011 | Nobukiyo | H04J 11/0093 709/226 |

(Continued)

OTHER PUBLICATIONS

Office Action to the corresponding Taiwan Patent Application rendered by the Taiwan Intellectual Property Office (TIPO) on May 17, 2016, 14 pages.

*Primary Examiner* — Dung Hong
(74) *Attorney, Agent, or Firm* — Skaar Ulbrich Macari, P.A.

(57) ABSTRACT

A direct mode communication system and a communication resource scheduling method thereof are provided. The direct mode communication system includes a base station and at least one client direct mode communication apparatus. The at least one client direct mode communication apparatus includes a first client direct mode communication apparatus. The first client direct mode communication apparatus contends in a communication resource contention pool to generate a communication resource contention message, and transmits the communication resource contention message to the base station. The base station decides a communication resource schedule for the at least one client direct mode communication apparatus according to the communication resource contention message.

26 Claims, 14 Drawing Sheets

(56) References Cited

U.S. PATENT DOCUMENTS

| | | | |
|---|---|---|---|
| 2011/0223953 A1 | 9/2011 | Lee et al. | |
| 2011/0287794 A1 | 11/2011 | Koskela et al. | |
| 2012/0243431 A1* | 9/2012 | Chen | H04W 72/0406 370/252 |
| 2013/0005377 A1* | 1/2013 | Wang | H04W 72/0406 455/509 |
| 2013/0170446 A1 | 7/2013 | Zheng | |
| 2014/0018010 A1* | 1/2014 | Gao | H04W 72/085 455/67.13 |
| 2015/0139197 A1* | 5/2015 | He | H04W 24/04 370/336 |
| 2015/0382365 A1* | 12/2015 | Li | H04L 5/0085 370/329 |
| 2016/0007336 A1* | 1/2016 | Fukuta | H04W 52/383 455/426.1 |
| 2016/0112977 A1* | 4/2016 | Byun | H04W 56/0015 370/350 |
| 2016/0234855 A1* | 8/2016 | Panteleev | H04W 36/0055 |
| 2016/0242152 A1* | 8/2016 | Yu | H04W 8/005 |
| 2016/0249311 A1* | 8/2016 | Yu | H04W 4/005 |
| 2016/0302251 A1* | 10/2016 | Chatterjee | H04W 8/005 |

* cited by examiner

DIRECT MODE COMMUNICATION SYSTEM AND COMMUNICATION RESOURCE SCHEDULING METHOD THEREOF

PRIORITY

This application claims priority to U.S. Provisional Patent Application No. 61/950,845 filed on Mar. 11, 2014, which is hereby incorporated by reference in its entirety.

FIELD

The present invention relates to a direct mode communication system and a communication resource scheduling method thereof; and more particularly, the direct mode communication system and the communication resource scheduling method thereof according to the present invention have a client direct mode communication apparatus report a contention result to assist a base station in scheduling the communication resources.

BACKGROUND

In the conventional direct mode communication technologies, primarily allocation of the communication resources is dominated by a base station, and the allocated communication resources are allocated by the base station to direct mode communication apparatuses that have a need for the communication resources. Then, the direct mode communication apparatuses can perform direct mode communications with other direct mode communication apparatuses via the communication resources allocated by the base station. However, such a resource allocation mechanism not only degrades the utilization efficiency of the spectrum resources, but also leads to an unduly high burden of the base station.

Specifically, in order to avoid interferences between direct mode communication apparatuses in a network due to repeated use of spectrum resources when the base station allocates communication resources to the direct mode communication apparatuses, the base station orthogonalizes the usable spectrum resources in such a way that the spectrum resource used by each direct mode communication connection is orthogonal to spectrum resources of other direct mode communication connections. In this way, interferences between the direct mode communication apparatuses can be avoided.

However, in situations where no interference is caused when direct mode communication apparatuses that are not adjacent to each other use a same spectrum resource to perform direct mode communications with other direct mode communication apparatuses respectively, such a mechanism that relies on the base station alone to allocate the communication resources will significantly degrade the utilization efficiency of the spectrum resources. On the other hand, relying on the base station alone to schedule all the communication resources will greatly increase the burden of the base station as the number of direct mode communication apparatuses in the network increases.

Accordingly, an urgent need exists in the art to provide a solution capable of improving the scheduling mechanism of the communication resources so as to significantly increase the utilization efficiency of the spectrum resources and ease the burden of the base station.

SUMMARY

A primary objective of certain embodiments of the present invention is to provide a communication resource scheduling method for a direct mode communication system. The direct mode communication system comprises a base station and at least one client direct mode communication apparatus. The at least one client direct mode communication apparatus includes a first client direct mode communication apparatus. The communication resource scheduling method comprising the following steps of: (a) enabling the first client direct mode communication apparatus to perform a communication channel measurement so as to generate a channel status message; (b) enabling the first client direct mode communication apparatus to transmit the channel status message to the base station; and (c) enabling the base station to decide a communication resource schedule of the at least one client direct mode communication apparatus of the direct mode communication system according to the channel status message.

To achieve the aforesaid objective, certain embodiments include a direct mode communication system, which comprises a base station and at least one client direct mode communication apparatus. The at least one client direct mode communication apparatus includes a first client direct mode communication apparatus. The first client direct mode communication apparatus is configured to: perform a communication channel measurement to generate a channel status message; and transmit the channel status message to the base station. The base station is configured to decide a communication resource schedule for the at least one client direct mode communication apparatus according to the channel status message.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof. However, these example embodiments are not intended to limit the present invention to any specific examples, embodiments, environment, applications or particular implementations described in these embodiments. Therefore, description of these example embodiments is only for purpose of illustration rather than to limit the present invention, and the scope of this application shall be governed by the claims.

It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1A:
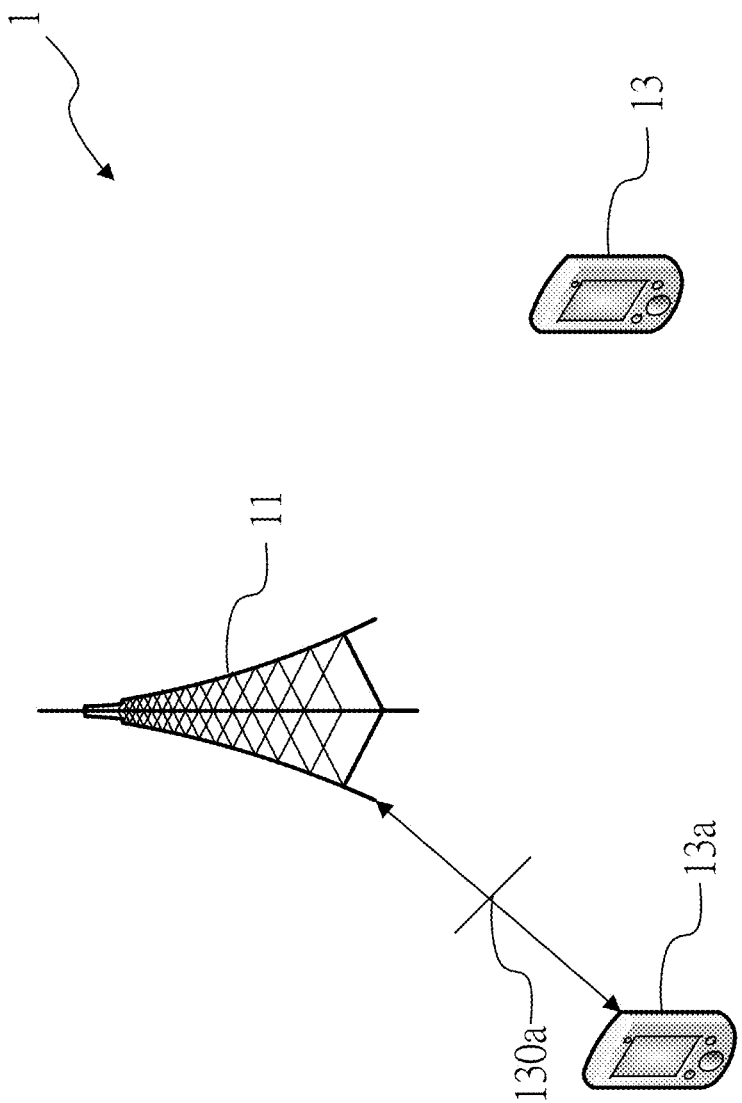
FIG. 1A is a schematic view of a direct mode communication system according to a first embodiment of the present invention.
Figure 1B:
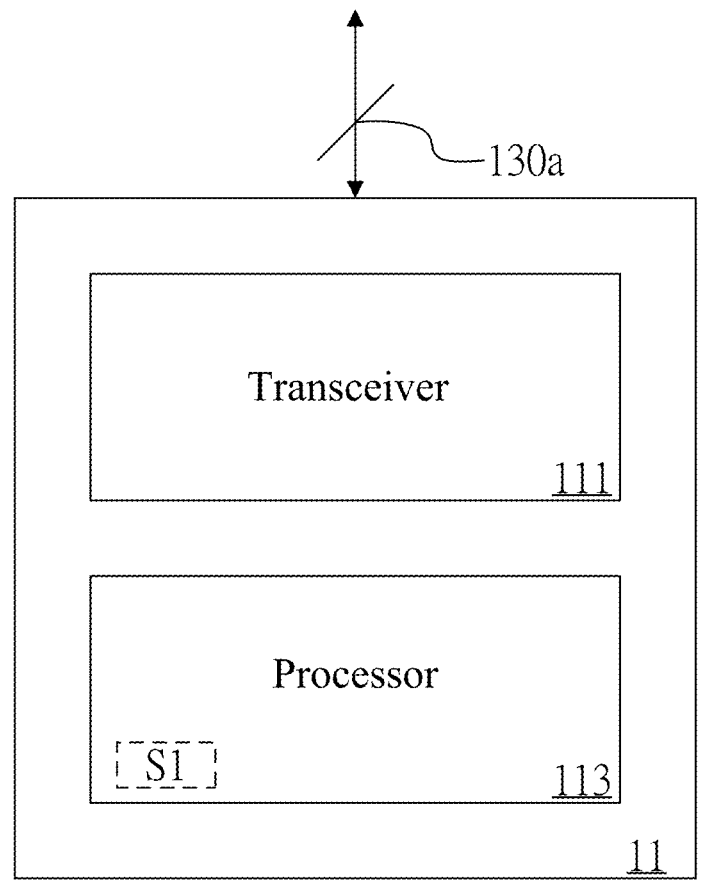
FIG. 1B is a schematic view of a base station according to the first embodiment of the present invention.
Figure 1C:
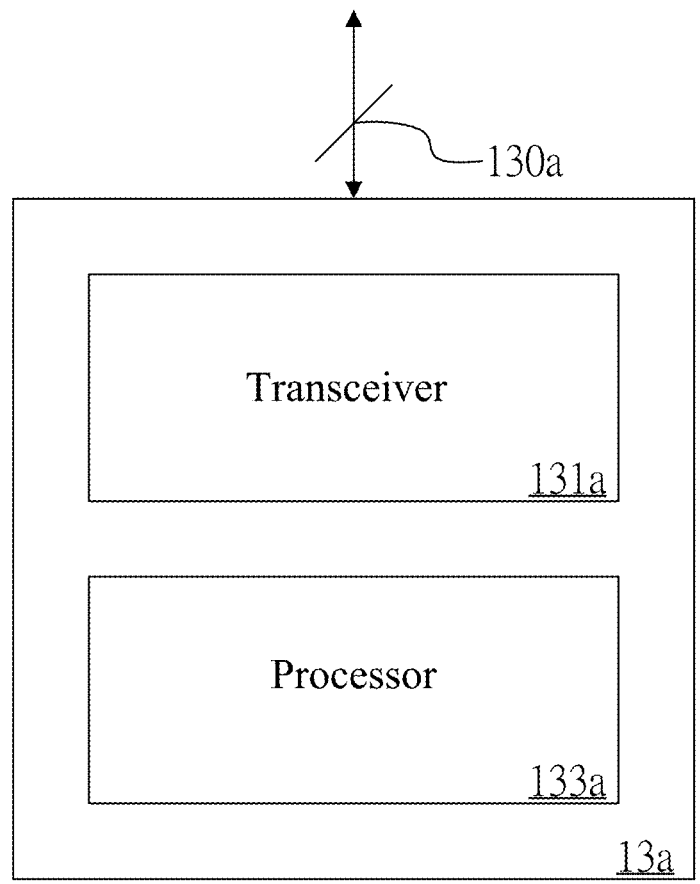
FIG. 1C is a schematic view of a first client direct mode communication apparatus according to the first embodiment of the present invention.

Please refer to FIGS. 1A~1C. FIG. 1A is a schematic view of a direct mode communication system 1 according to a first embodiment of the present invention. The direct mode communication system 1 comprises a base station 11 and at least one client direct mode communication apparatus 13. The at least one client direct mode communication apparatus 13 includes a first client direct mode communication apparatus 13a. FIG. 1B is a block diagram of a base station 11 according to the first embodiment of the present invention. The base station 11 comprises a transceiver 111 and a processor 113. FIG. 1C is a block diagram of the first client direct mode communication apparatus 13a according to the first embodiment of the present invention. The first client direct mode communication apparatus 13a comprises a transceiver 131a and a processor 133a. Interactions among the individual elements will be further described hereinbelow.

Firstly, the first client direct mode communication apparatus 13a may perform a communication resource contention procedure to decide whether it can directly contend for a communication resource that is needed. In detail, the processor 133a of the first client direct mode communication apparatus 13a performs a communication channel measurement to generate a channel status message 130a.

Next, the transceiver 131a of the first client direct mode communication apparatus 13a transmits the channel status message 130a to the base station 11 to report a communication resource status determination result of the first client direct mode communication apparatus 13a (i.e., a communication resource usage status of the first client direct mode communication apparatus 13a in the channel) back to the base station 11. Then, after the channel status message 130a has been received by the transceiver 111 of the base station 11, the processor 113 can determine a current usage condition of the communication resources according to the channel status message 130a to decide a communication resource schedule S1 for the at least one client direct mode communication apparatus 13.

It shall be particularly noted that, in the first embodiment, the communication resources and the technology of determining the communication resource status shall be appreciated by those skilled in the art. Because the present invention mainly focuses on reporting the communication resource status determination result back to the base station by the direct mode apparatus to facilitate scheduling by the base station, how the communication resource status is determined will not be further described herein.

It shall also be noted that, reporting of different determination results corresponds to different scheduling modes. For example, if the first client direct mode communication apparatus 13a determines that the communication resource has been successfully obtained, then the transceiver 131a of the first client direct mode communication apparatus 13a transmits the channel status message 130a to the base station 11 so as to report the communication resource usage status of the first client direct mode communication apparatus 13a back to the base station 11.

Accordingly, after the channel status message 130a has been received by the transceiver 111 of the base station 11, the processor 113 may determine that there is a communication resource available for use by the first client direct mode communication apparatus 13a according to the channel status message 130a. Thus, the communication resource used by the first client direct mode communication apparatus 13a may also be allocated by the base station 11 to a client direct mode communication apparatus that is not adjacent to the first client direct mode communication apparatus 13a so as to improve the utilization efficiency of the communication spectrum resources without causing interferences.

On the other hand, if the first client direct mode communication apparatus 13a determines that there is no communication resource available, the transceiver 131a of the first client direct mode communication apparatus 13a transmits the channel status message 130a to the base station 11 to report the communication resource usage status of the first client direct mode communication apparatus 13a to the base station 11.

Accordingly, after the channel status message 130a has been received by the transceiver 111 of the base station 11, the processor 113 can collect and orthogonalize communication resources unavailable for use and allocate a part of the orthogonalized communication resources to the first client direct mode communication apparatus 13a that has no communication resource so that subsequent communications can be made by the first client direct mode communication apparatus 13a.

It shall be additionally emphasized, the aforesaid communication channel measurement may be one of a communication resource contention measurement and a channel sensing measurement. If the communication channel measurement is the communication resource contention measurement, then the channel status message 130a may be a channel resource contention message configured to indicate that the first client direct mode communication apparatus 13a succeeds or fails in the resource contention. If the communication channel measurement is the channel sensing measurement, then the channel status message 130a may be a channel resource sensing message which is also configured to indicate the communication resource usage status of the first client direct mode communication apparatus 13a.

Figure 2A:
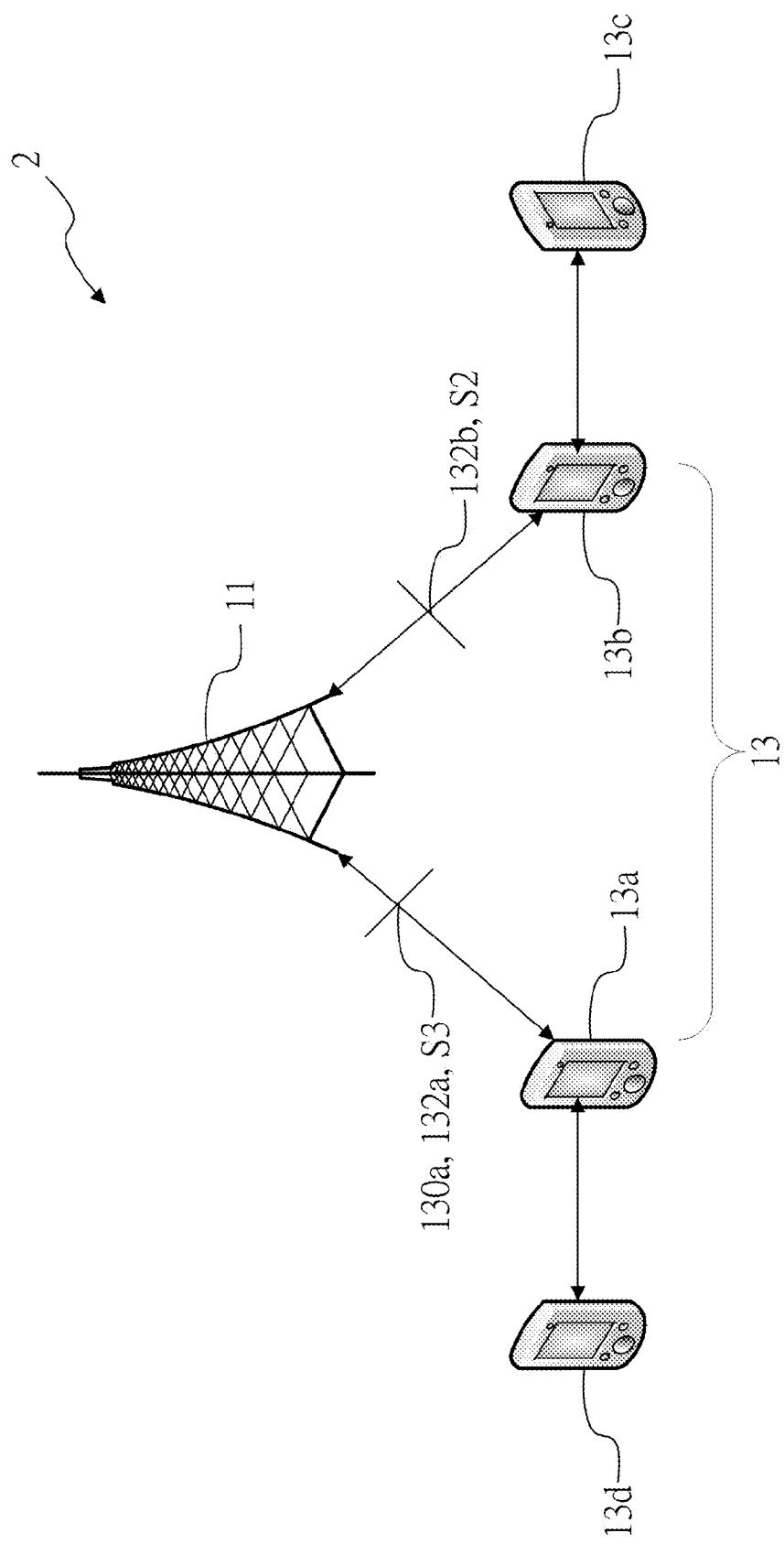
FIG. 2A is a schematic view of a direct mode communication system according to a second embodiment of the present invention.
Figure 2B:
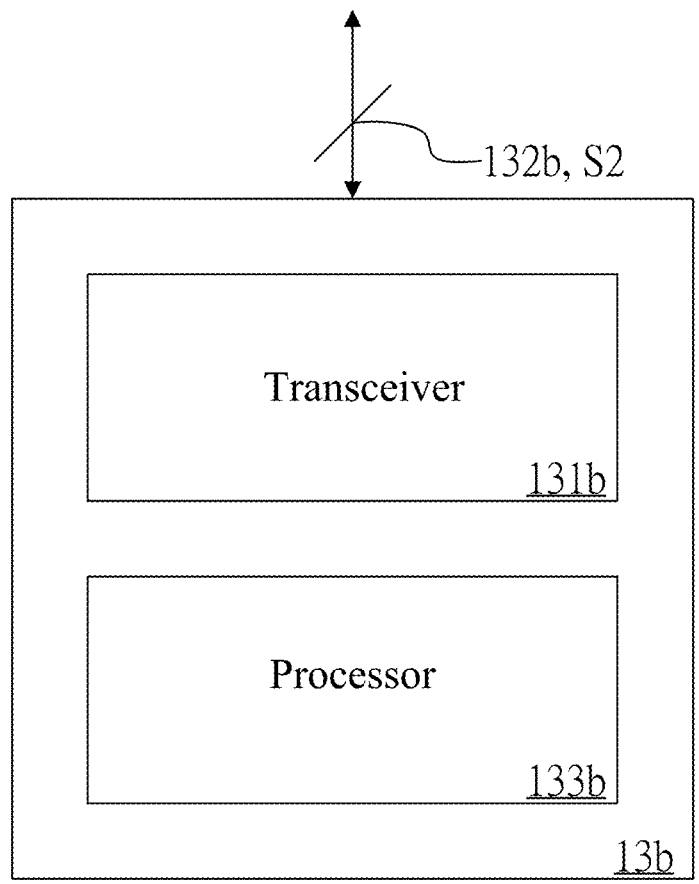
FIG. 2B is a schematic view of a second client direct mode communication apparatus according to the second embodiment of the present invention.

Please refer to FIGS. 2A~2B. FIG. 2A is a schematic view of a direct mode communication system 2 according to a second embodiment of the present invention. The architecture of the second embodiment is similar to that of the first embodiment, so elements represented by the same symbols have the same functions and will not be further described herein. The second embodiment differs from the first embodiment in that, the at least one client direct mode communication apparatus 13 in the direct mode communication system 2 further includes a second client direct mode communication apparatus 13b. FIG. 2B is a block diagram of the second client direct mode communication apparatus 13b in the second embodiment of the present invention. The second client direct mode communication apparatus 13b comprises a transceiver 131b and a processor 133b.

The second embodiment is intended to describe various implementations of transmitting the communication resource schedule to the client direct mode communication apparatuses by the base station. According to a first implementation, if there is a communication resource available for the first client direct mode communication apparatus 13a (i.e., the communication resource contention is successful or an available communication resource is sensed), the channel status message 130a can comprise the determination result on the communication resource usage status.

In this case, because there is a communication resource available for the first client direct mode communication apparatus 13a (i.e., the communication resource contention is successful or an available communication resource is sensed), the first client direct mode communication apparatus 13a can perform a direct mode communication with other client direct mode communication apparatuses by directly using the obtained communication resource after having transmitted the channel status message 130a to the base station 11.

On the other hand, the processor 113 of the base station 11 excludes the communication resource used by the first client direct mode communication apparatus 13a according to the channel status message 130a comprising the communication resource usage status information, and orthogonalizes the remaining communication resources to accomplish a communication resource schedule S2.

Then, if there is no communication resource available for use by the second client direct mode communication apparatus 13b (i.e., the communication resource contention fails or no available communication resource is sensed), a scheduling request 132b may be transmitted via the transceiver 131b to the base station 11. After the scheduling request 132b has been received by the transceiver 111 of the base station 11, the processor 113 can transmit the communication resource schedule S2 via the transceiver 111 to the second client direct mode communication apparatus 13b according to the scheduling request 132b.

In this way, even when no communication resource is available for the second client direct mode communication apparatus 13b (i.e., the communication resource contention fails or no communication resource is sensed), the second client direct mode communication apparatus 13b can still perform a direct mode communication with other client direct mode communication apparatuses (e.g., a third client direct mode communication apparatus 13c) according to the schedule provided by the base station 11 (i.e., according to the communication resource schedule S2).

According to a second implementation, if there is no communication resource available for the first client direct mode communication apparatus 13a (i.e., if the communication resource contention fails or no communication resource is sensed), the channel status message 130a can comprise the communication resource usage status. In this case, the processor 113 of the base station 11 orthogonalizes usable communication resources according to the channel status message 130a comprising the communication resource usage status to accomplish a communication resource schedule S3.

Then, the first client direct mode communication apparatus 13a that has no communication resource available (i.e., the contention fails or no communication resource is sensed) can transmit a scheduling request 132a to the base station 11 directly via the transceiver 131a. After the scheduling request 132a has been received by the transceiver 111 of the base station 11, the processor 113 can transmit the communication resource schedule S3 to the first client direct mode communication apparatus 13a via the transceiver 111 in response to the scheduling request 132a.

In this way, even when no communication resource is available for the first client direct mode communication apparatus 13a (i.e., the communication resource contention fails or no communication resource is sensed), the first client direct mode communication apparatus 13a can still perform a direct mode communication with other client direct mode communication apparatuses (e.g., a fourth client direct mode communication apparatus 13d) according to the schedule provided by the base station 11 (i.e., according to the communication resource schedule S3).

Additionally, it shall be particularly noted that, if the communication channel measurement is a communication resource contention measurement in the various implementations of the second embodiment, the channel status message 130a may be a communication resource contention message comprising a communication resource usage status. Then, after the communication resource contention message has been received by the transceiver 111 of the base station 11, the processor 113 can re-adjust a size of the communication resource contention pool according to the communication resource usage status for subsequent use by the client direct mode communication apparatuses.

For example, if the first client direct mode communication apparatus 13a continuously fails in the communication resource contention in the second implementation, then the first client direct mode communication apparatus 13a may inform the base station 11 of this via the communication resource usage status comprised in the channel status message 130a so that the base station 11 can adjust the content of the communication resource contention pool correspondingly to improve the success rate of the first client direct mode communication apparatus 13a in the communication resource contention.

Or, if the first client direct mode communication apparatus 13a continuously succeeds in the communication resource contention in the first implementation, then the first client direct mode communication apparatus 13a may inform the base station 11 of this via the channel resource usage status comprised in the channel status message 130a so that the base station 11 can adjust the content of the communication resource contention pool correspondingly to balance the success rates of all the client direct mode communication apparatuses in the communication resource contention.

Figure 3:
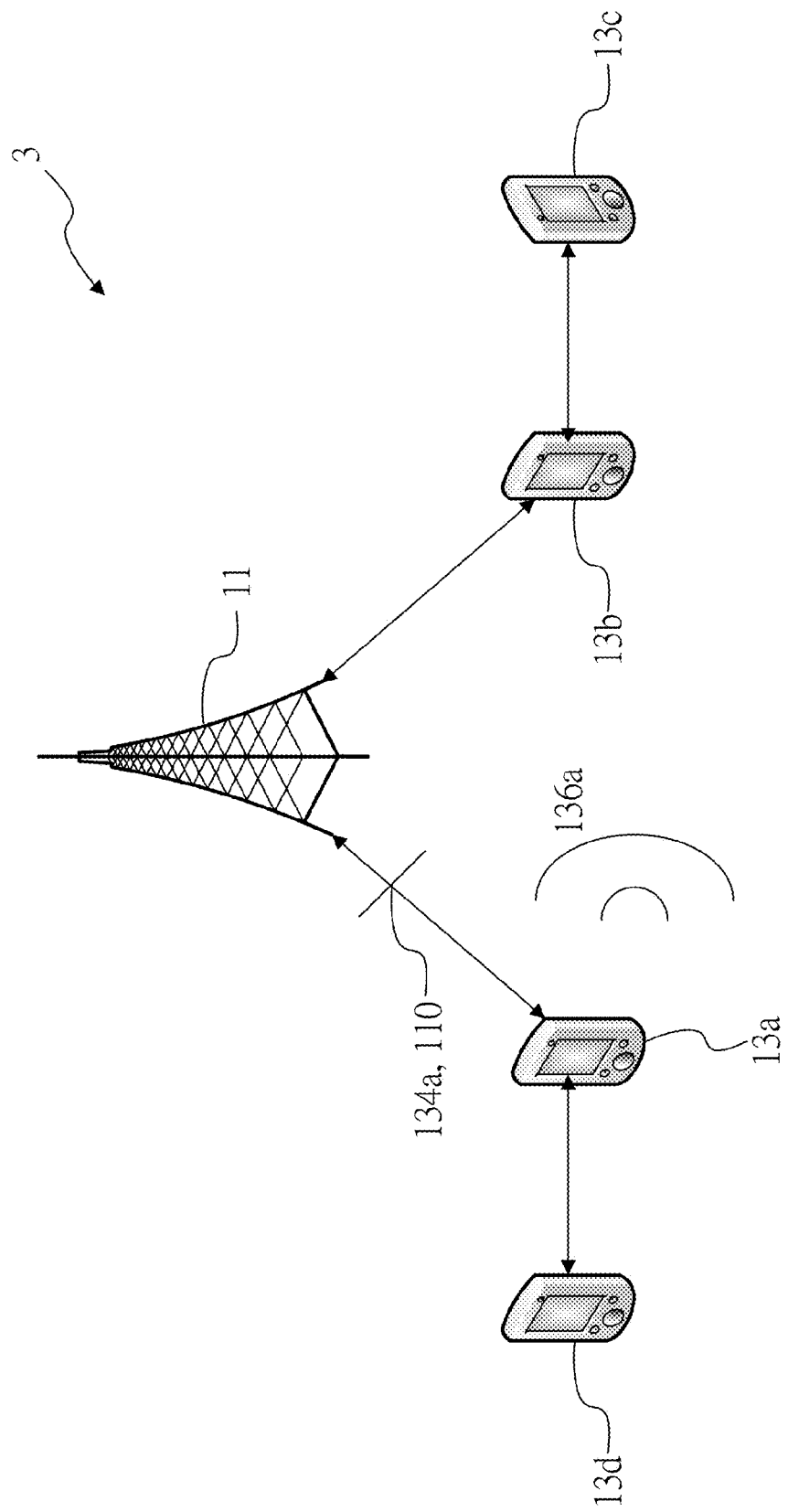
FIG. 3 is a schematic view of a direct mode communication system according to a third embodiment of the present invention.

Please refer to FIG. 3, which is a schematic view of a direct mode communication system 3 according to a third embodiment of the present invention. The architecture of the third embodiment is similar to those of the previous embodiments, so elements represented by the same symbols have the same functions and will not be further described herein. The third embodiment differs from the previous embodiments in that, the direct mode communication system 3 has a designated communication frequency channel (not depicted). The following exemplary examples will mainly describe use of the designated communication frequency channel.

Specifically, when the first client direct mode communication apparatus 13a and the fourth client direct mode communication apparatus 13d are to transmit a large amount of data therebetween by using an additional communication resource after they have performed a direct mode communication therebetween, an unlicensed network frequency band may be tried in addition to the licensed network frequency band.

Further speaking, the transceiver 131a of the first client direct mode communication apparatus 13a may transmit an additional communication resource request 134a to the base station 11 in the designated communication frequency channel. After the additional communication resource request 134a has been received by the transceiver 111 of the base station 11, the processor 113 can transmit an appended resource indication 110 to the first client direct mode communication apparatus 13a via the transceiver 111. Here, the appended resource indication 110 is mainly used to indicate whether there is any additional network resource available in the licensed frequency channel or the unlicensed frequency channel.

Then, after the appended resource indication 110 has been received by the transceiver 131a of the first client direct mode communication apparatus 13a, the processor 133a may try to use an appended communication resource (not depicted) in one of an unlicensed frequency channel (not depicted) and a licensed frequency channel (not depicted) via the transceiver 131a. In this way, the appended communication resource additionally obtained can be further used by the first client direct mode communication apparatus 13a to perform a direct mode communication subsequently.

For example, the direct mode communication system mainly takes the frequency band of the LTE (Long Term Evolution) network as the licensed frequency channel, and in contrast, the network frequency band used by Wi-Fi is an unlicensed frequency channel for the direct mode communication system. Accordingly, the aforesaid technology is mainly intended to allow the client direct mode communication apparatuses to further use an additional appended communication resource in the LTE frequency band licensed to the direct mode communication apparatuses or in the Wi-Fi frequency band unlicensed to the direct mode communication apparatuses so as to facilitate subsequent direct mode communications. The aforesaid appended communication resource may be a contention pool additionally provided in the licensed frequency band or a network resource in the unlicensed frequency channel.

It shall be particularly noted that, in the third embodiment, it may also be that the processor 113 of the base station 11 directly instructs the client direct mode communication apparatuses to use an additional network resource according to a channel usage status (not depicted) of the designated communication frequency channel. In other words, the processor 113 of the base station 11 may directly transmit the appended resource indication 110 to the first client direct mode communication apparatus 13a via the transceiver 111 and according to the channel usage status of the designated communication frequency channel so as to facilitate subsequent direct mode communications of the first client direct mode communication apparatus 13a.

Additionally, the transceiver 131a of the first client direct mode communication apparatus 13a may also broadcast a used communication resource message 136a via the designated frequency channel to indicate communication resources used by the first client direct mode communication apparatus 131 to perform the direct mode communication with the fourth client direct mode communication apparatus 13d. In this way, selecting the same communication resource for channel condition determination by other client direct mode communication apparatuses (e.g., the second client direct mode communication apparatus 13b and the third client direct mode communication apparatus 13c) can be avoided to decrease the operation complexity and to avoid interferences.

Figure 4:
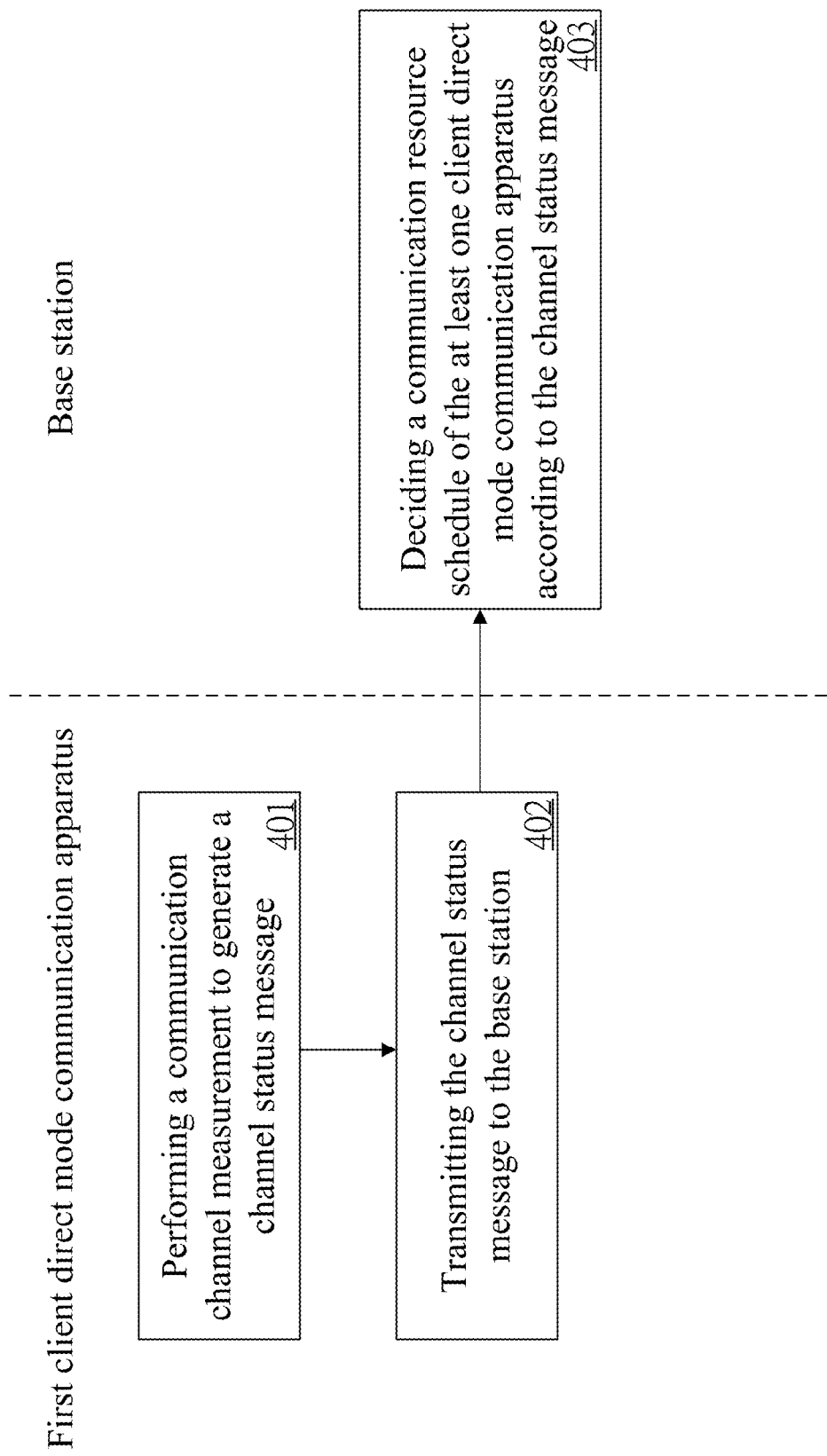
FIG. 4 is a flowchart diagram of a communication resource scheduling method according to a fourth embodiment of the present invention.

A fourth embodiment of the present invention is a communication resource scheduling method, a flowchart diagram of which is shown in FIG. 4. The method of the fourth embodiment is used in a direct mode communication system (e.g., the direct mode communication system of any of the previous embodiments). The direct mode communication system comprises a base station and at least one client direct mode communication apparatus. The at least one client direct mode communication apparatus includes a first client direct mode communication apparatus. Steps of the fourth embodiment are detailed as follows.

Firstly, step 401 is executed to enable the first client direct mode communication apparatus to perform a communication channel measurement (which may be one of a communication resource contention measurement and a channel sensing measurement) to generate a channel status message. Then, step 402 is executed to enable the first client direct mode communication apparatus to transmit the channel status message to the base station. Finally, step 403 is executed to enable the base station to decide a communication resource schedule of the at least one client direct mode communication apparatus according to the channel status message.

Figure 5:
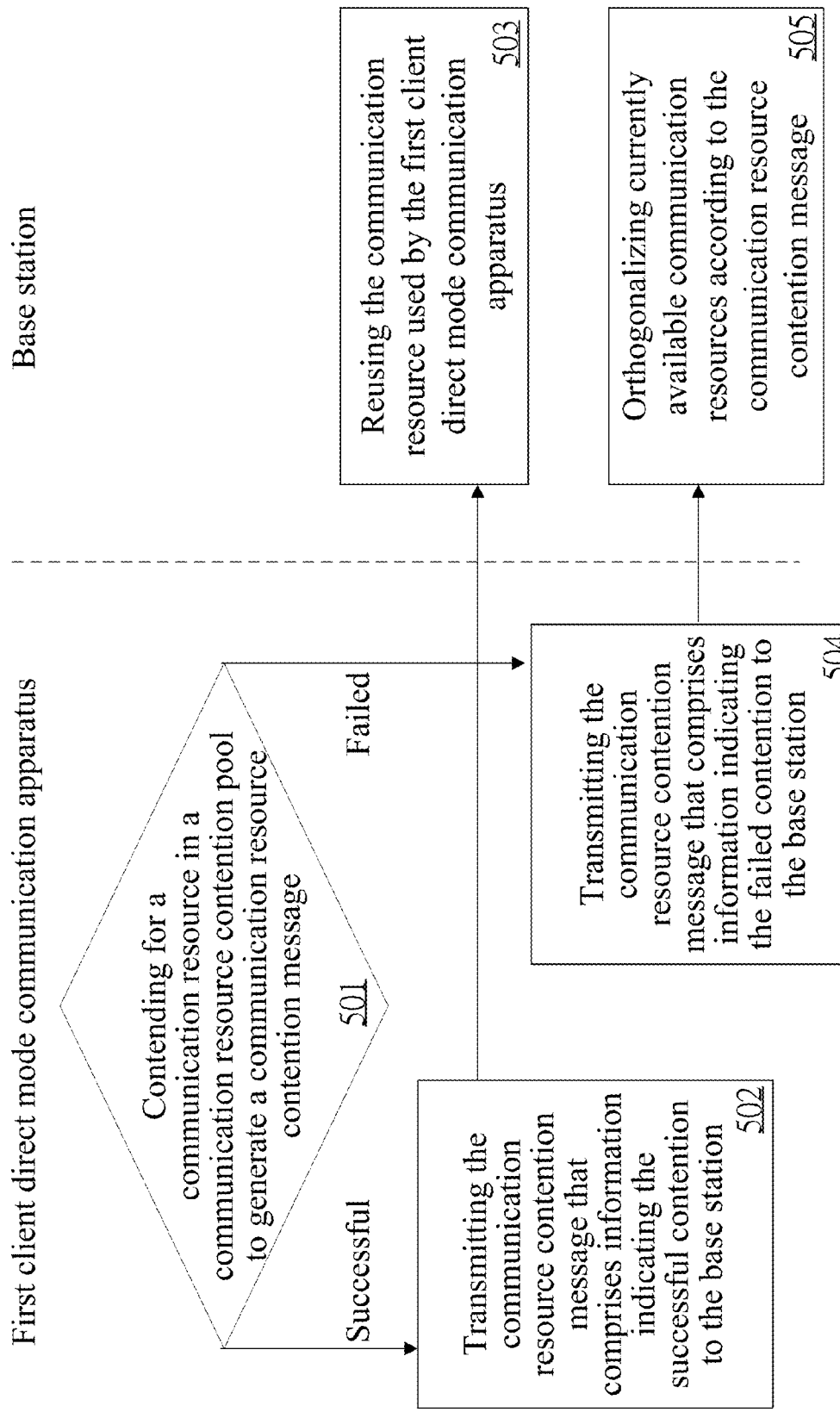
FIG. 5 is a flowchart diagram of a communication resource scheduling method according to a fifth embodiment of the present invention.

A fifth embodiment of the present invention is a communication resource scheduling method, a flowchart diagram of which is shown in FIG. 5. The method of the fifth embodiment is used in a direct mode communication system (e.g., the direct mode communication system of any of the previous embodiments). The direct mode communication system comprises a base station and at least one client direct mode communication apparatus. The at least one client direct mode communication apparatus includes a first client direct mode communication apparatus. Steps of the fifth embodiment are detailed as follows.

Firstly, step 501 is executed to enable the first client direct mode communication apparatus to contend for a communication resource in a communication resource contention pool to generate a communication resource contention message. If it succeeds in the contention, step 502 is executed to enable the first client direct mode communication apparatus to transmit the communication resource contention message that comprises information indicating the successful contention to the base station.

Then, step 503 is executed to enable the base station to reuse the communication resource used by the first client direct mode communication apparatus (i.e., to arrange the communication resource used by the first client direct mode communication apparatus into the communication resource schedule of other non-adjacent client direct mode communication apparatuses).

On the other hand, if the contention fails, step 504 is executed to enable the first client direct mode communication apparatus to transmit the communication resource contention message that comprises information indicating the failed contention to the base station. Then, step 505 is executed to enable the base station to orthogonalize available communication resources currently collected so that these communication resources can be subsequently used by client direct mode communication apparatuses that need a communication resource schedule.

Figure 6:
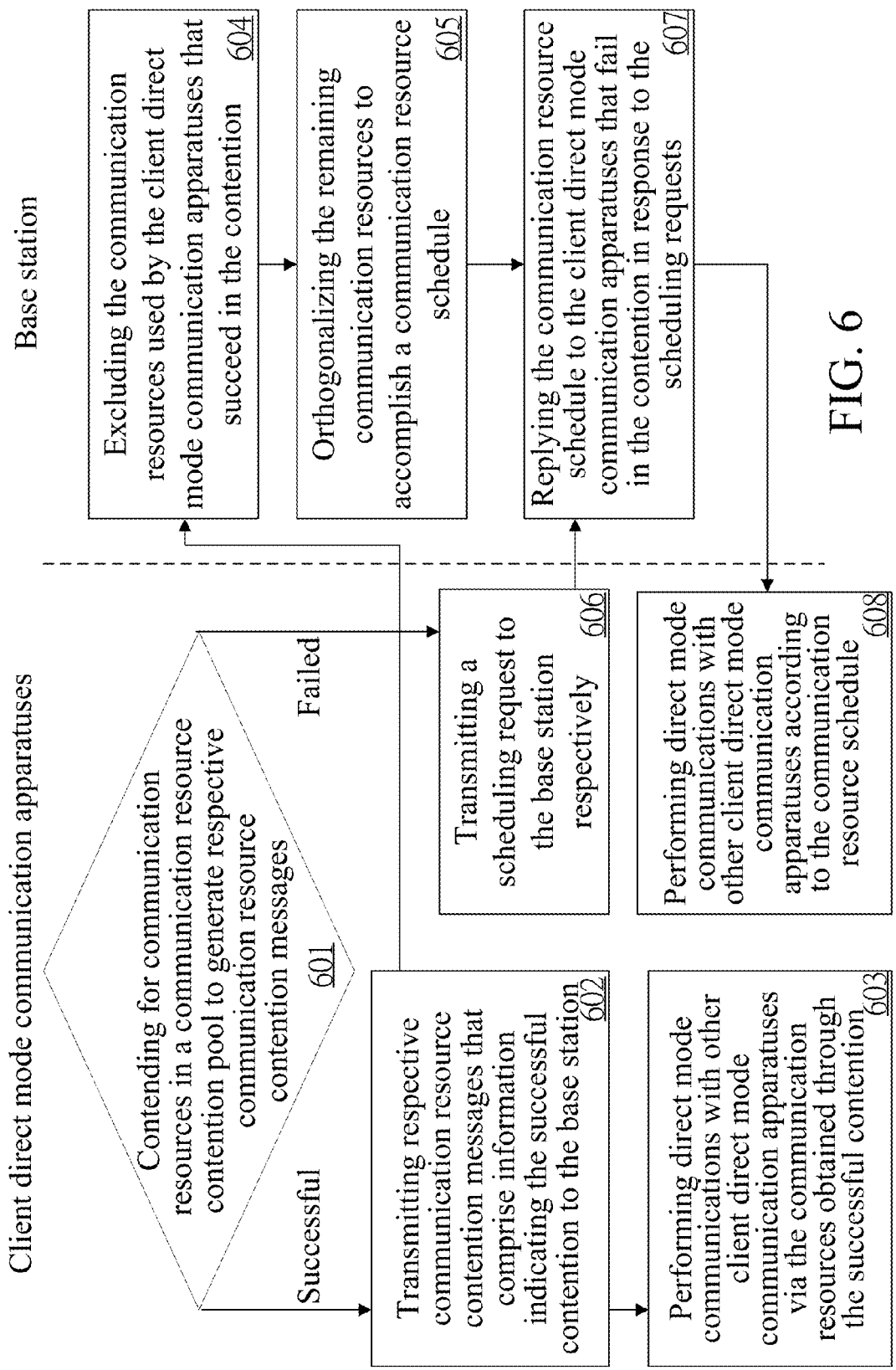
FIG. 6 is a flowchart diagram of a communication resource scheduling method according to a sixth embodiment of the present invention.

A sixth embodiment of the present invention is a communication resource scheduling method, a flowchart diagram of which is shown in FIG. 6. The method of the sixth embodiment is used in a direct mode communication system (e.g., the direct mode communication system of any of the previous embodiments). The direct mode communication system comprises a base station and a plurality of client direct mode communication apparatuses. Steps of the sixth embodiment are detailed as follows.

Firstly, step 601 is executed to enable the plurality of client direct mode communication apparatuses to contend for communication resources in a communication resource contention pool to generate respective communication resource contention messages. For those of the client direct mode communication apparatuses that succeed in the contention, step 602 is executed to enable the client direct mode communication apparatuses to transmit respective communication resource contention messages that comprise information indicating the successful contention to the base station. Then, step 603 is executed to enable the client direct mode communication apparatuses to perform direct mode communications with other client direct mode communication apparatuses via the communication resources obtained through the successful contention.

Next, step 604 is executed to enable the base station to exclude the communication resources used by the client direct mode communication apparatuses that succeed in the contention, and step 605 is executed to enable the base station to orthogonalize the remaining communication resources to accomplish a communication resource schedule.

On the other hand, for those of the client direct mode communication apparatuses that fail in the contention, step 606 is executed to enable the client direct mode communication apparatuses to transmit a scheduling request to the base station respectively. Step 607 is executed to enable the base station to reply the communication resource schedule to the client direct mode communication apparatuses that fail in the contention in response to the scheduling requests. Step 608 is executed to enable the client direct mode communication apparatuses that fail in the contention to perform direct mode communications with other client direct mode communication apparatuses according to the communication resource schedule.

Figure 7:
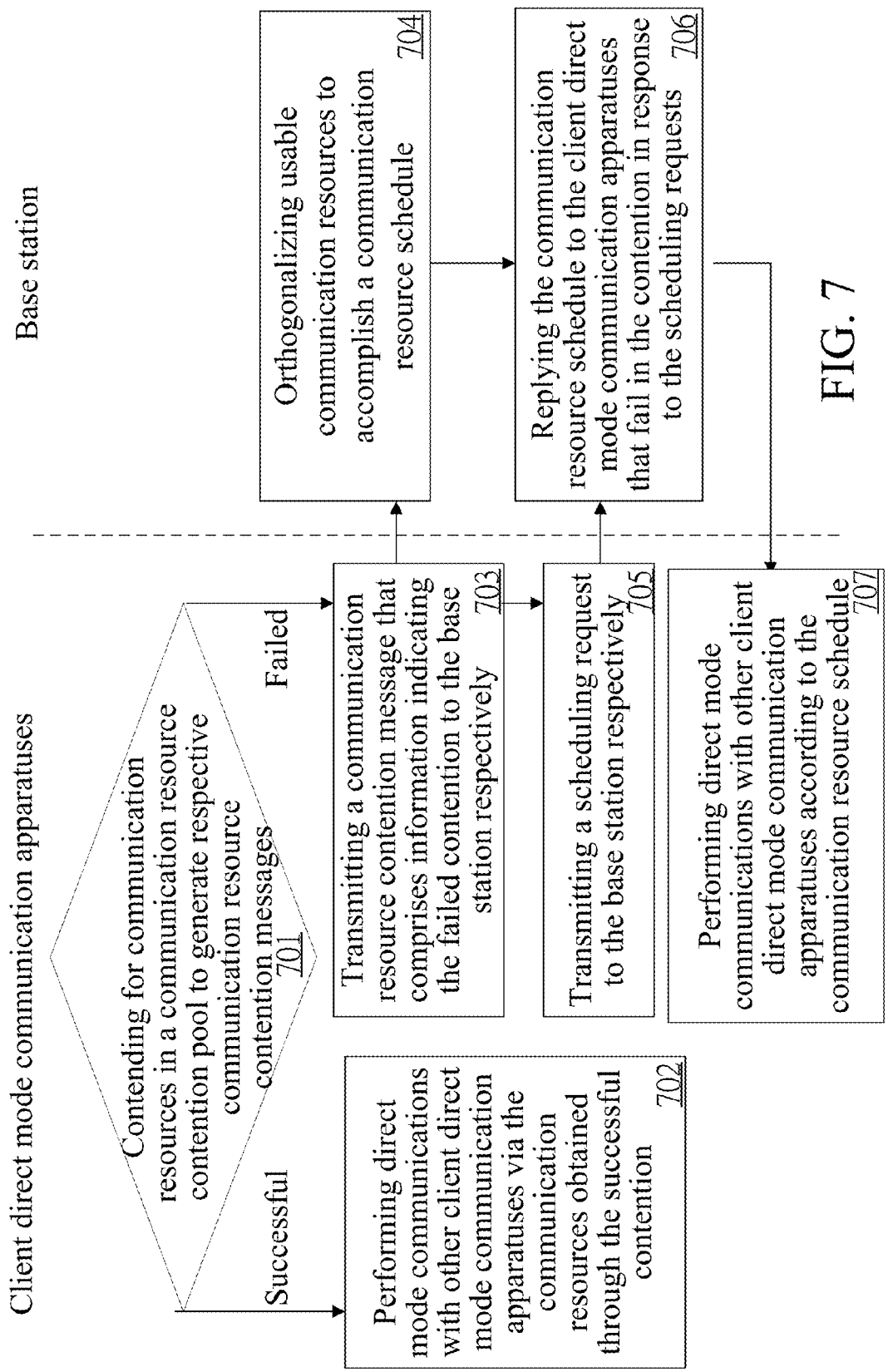
FIG. 7 is a flowchart diagram of a communication resource scheduling method according to a seventh embodiment of the present invention.

A seventh embodiment of the present invention is a communication resource scheduling method, a flowchart diagram of which is shown in FIG. 7. The method of the seventh embodiment is used in a direct mode communication system (e.g., the direct mode communication system of any of the previous embodiments). The direct mode communication system comprises a base station and a plurality of client direct mode communication apparatuses. Steps of the seventh embodiment are detailed as follows.

Firstly, step 701 is executed to enable the plurality of client direct mode communication apparatuses to contend for communication resources in a communication resource contention pool to generate respective communication resource contention messages. For those of the client direct mode communication apparatuses that succeed in the contention, step 702 is executed to enable the client direct mode communication apparatuses to perform direct mode communications with other client direct mode communication apparatuses directly via the communication resources obtained through the successful contention.

On the other hand, for those of the client direct mode communication apparatuses that fail in the contention, step 703 is executed to enable the client direct mode communication apparatuses to transmit a communication resource contention message that comprises information indicating the failed contention to the base station respectively. Step 704 is executed to enable the base station to orthogonalize usable communication resources to accomplish a communication resource schedule.

Then, step 705 is executed to enable the client direct mode communication apparatuses that fail in the contention to transmit a scheduling request to the base station respectively. Step 706 is executed to enable the base station to reply the communication resource schedule to the client direct mode communication apparatuses that fail in the contention in response to the scheduling requests. Step 707 is executed to enable the client direct mode communication apparatuses that fail in the contention to perform direct mode communications with other client direct mode communication apparatuses according to the communication resource schedule.

Figure 8:
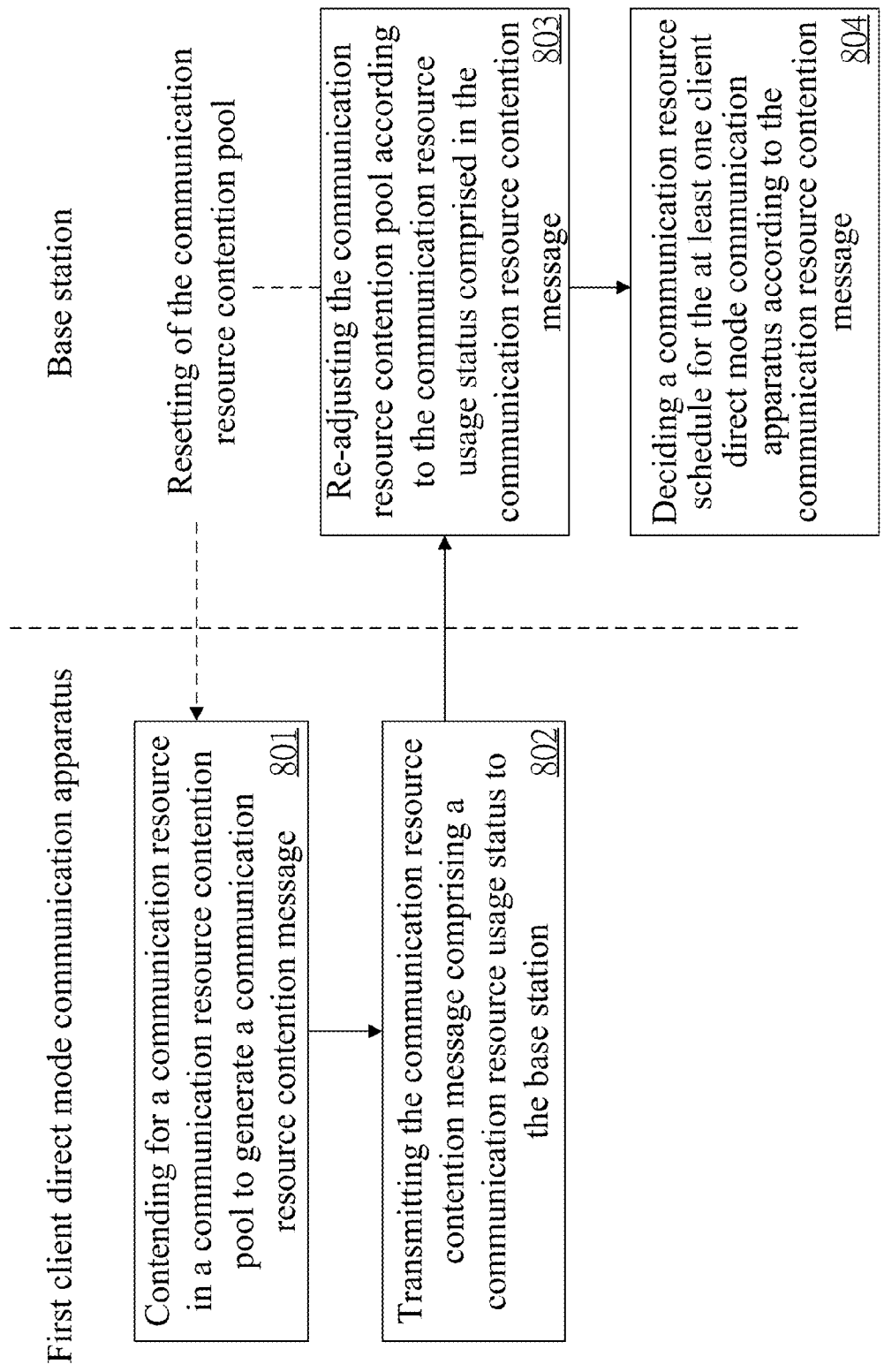
FIG. 8 is a flowchart diagram of a communication resource scheduling method according to an eighth embodiment of the present invention.

An eighth embodiment of the present invention is a communication resource scheduling method, a flowchart diagram of which is shown in FIG. 8. The method of the eighth embodiment is used in a direct mode communication system (e.g., the direct mode communication system of any of the previous embodiments). The direct mode communication system comprises a base station and at least one client direct mode communication apparatus. The at least one client direct mode communication apparatus includes a first client direct mode communication apparatus. Steps of the eighth embodiment are detailed as follows.

Firstly, step 801 is executed to enable the first client direct mode communication apparatus to contend for a communication resource in a communication resource contention pool to generate a communication resource contention message. The communication resource contention message comprises a communication resource usage status. Step 802 is executed to enable the first client direct mode communication apparatus to transmit the communication resource contention message to the base station.

Then, step 803 is executed to enable the base station to re-adjust the communication resource contention pool according to the communication resource usage status comprised in the communication resource contention message so as to balance the success rates of all the client direct mode communication apparatuses in subsequent communication resource contentions. Finally, step 804 is executed to enable the base station to decide a communication resource schedule for the at least one client direct mode communication apparatus according to the communication resource contention message.

Figure 9:
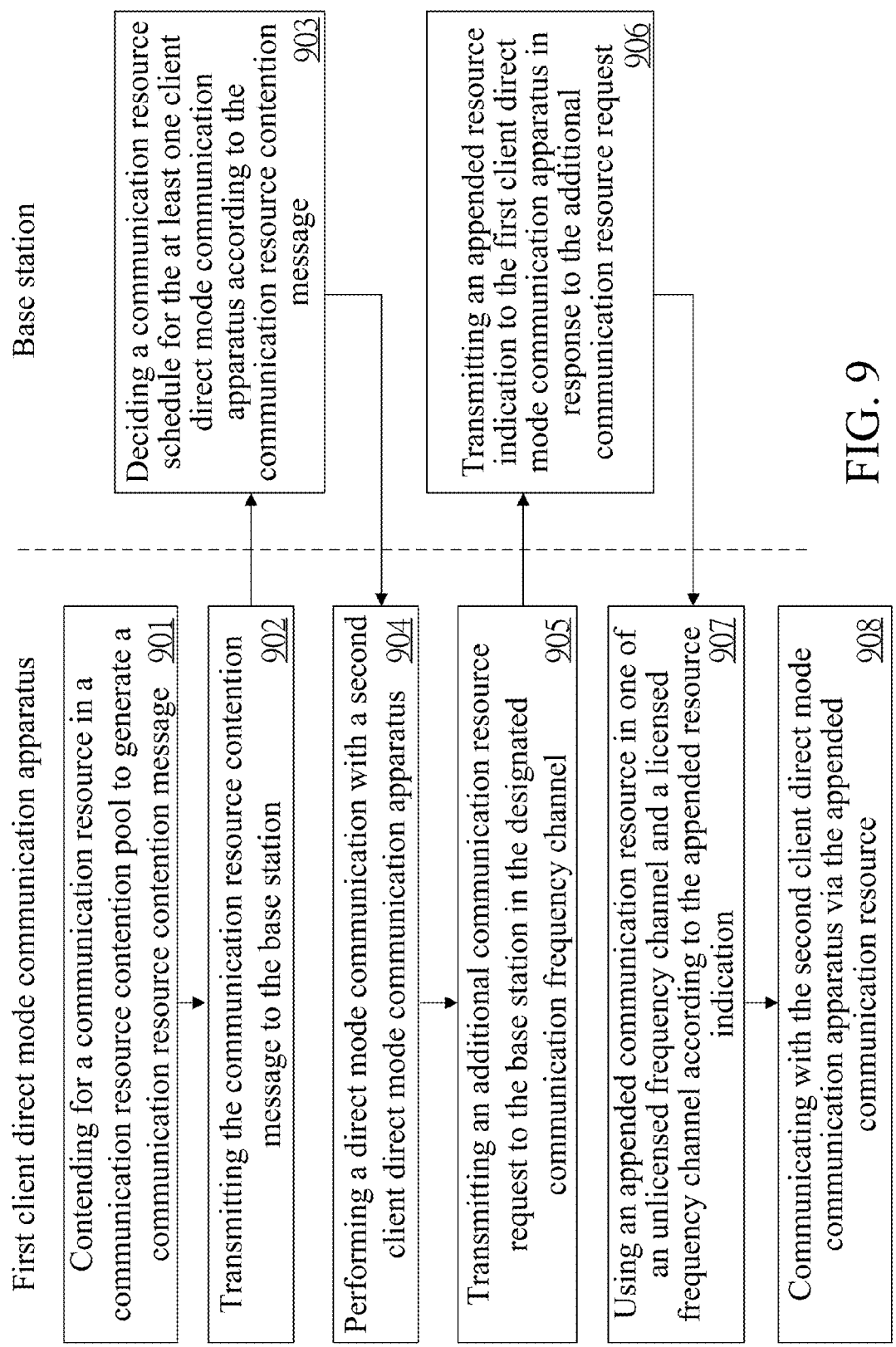
FIG. 9 is a flowchart diagram of a communication resource scheduling method according to a ninth embodiment of the present invention.

A ninth embodiment of the present invention is a communication resource scheduling method, a flowchart diagram of which is shown in FIG. 9. The method of the ninth embodiment is used in a direct mode communication system (e.g., the direct mode communication system of any of the previous embodiments). The direct mode communication system comprises a base station and at least one client direct mode communication apparatus, and has a designated communication frequency channel. The at least one client direct mode communication apparatus includes a first client direct mode communication apparatus. Steps of the ninth embodiment are detailed as follows.

Firstly, step 901 is executed to enable the first client direct mode communication apparatus to contend for a communication resource in a communication resource contention pool to generate a communication resource contention message. Step 902 is executed to enable the first client direct mode communication apparatus to transmit the communication resource contention message to the base station. Step 903 is executed to enable the base station to decide a communication resource schedule for the at least one client direct mode communication apparatus according to the communication resource contention message. Step 904 is executed to enable the first client direct mode communication apparatus to perform a direct mode communication with a second client direct mode communication apparatus.

Next, step 905 is executed to enable the first client direct mode communication apparatus to transmit an additional communication resource request to the base station in the designated communication frequency channel. Step 906 is executed to enable the base station to transmit an appended resource indication to the first client direct mode communication apparatus in response to the additional communication resource request.

Subsequently, step 907 is executed to enable the first client direct mode communication apparatus to use an appended communication resource in one of an unlicensed frequency channel and a licensed frequency channel according to the appended resource indication. Finally, step 908 is executed to enable the first client direct mode communication apparatus to communicate with the second client direct mode communication apparatus via the appended communication resource.

Figure 10:
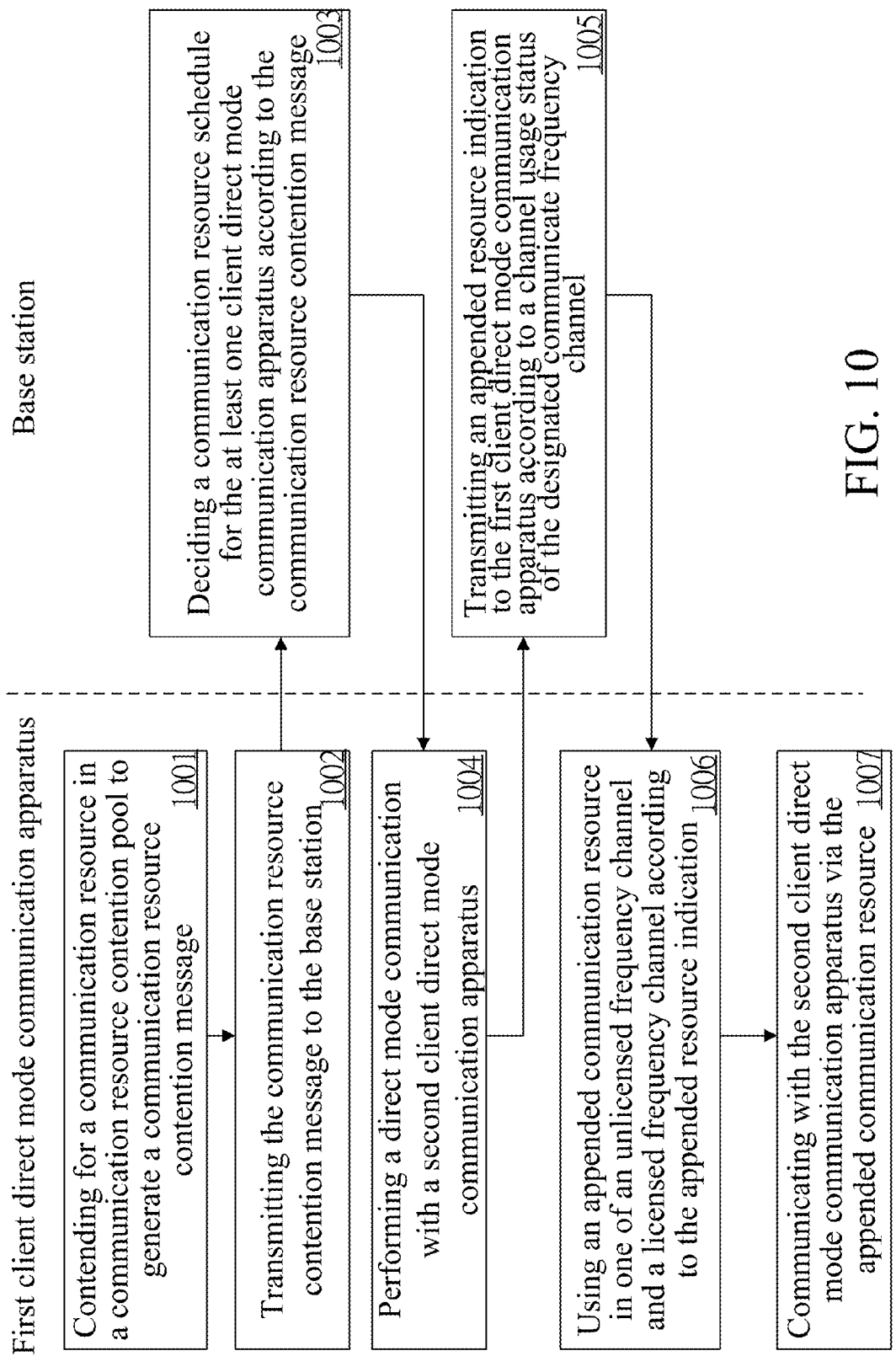
FIG. 10 is a flowchart diagram of a communication resource scheduling method according to a tenth embodiment of the present invention.

A tenth embodiment of the present invention is a communication resource scheduling method, a flowchart diagram of which is shown in FIG. 10. The method of the tenth embodiment is used in a direct mode communication system (e.g., the direct mode communication system of any of the previous embodiments). The direct mode communication system comprises a base station and at least one client direct mode communication apparatus, and has a designated communication frequency channel. The at least one client direct mode communication apparatus includes a first client direct mode communication apparatus. Steps of the tenth embodiment are detailed as follows.

Firstly, step 1001 is executed to enable the first client direct mode communication apparatus to contend for a communication resource in a communication resource contention pool to generate a communication resource contention message. Step 1002 is executed to enable the first client direct mode communication apparatus to transmit the communication resource contention message to the base station. Step 1003 is executed to enable the base station to decide a communication resource schedule for the at least one client direct mode communication apparatus according to the communication resource contention message. Step 1004 is executed to enable the first client direct mode communication apparatus to perform a direct mode communication with a second client direct mode communication apparatus.

Next, step 1005 is executed to enable the base station to transmit an appended resource indication to the first client direct mode communication apparatus according to a channel usage status of the designated communicate frequency channel. Step 1006 is executed to enable the first client direct mode communication apparatus to use an appended communication resource in one of an unlicensed frequency channel and a licensed frequency channel according to the appended resource indication. Finally, step 1007 is executed to enable the first client direct mode communication apparatus to communicate with the second client direct mode communication apparatus via the appended communication resource.

Figure 11:
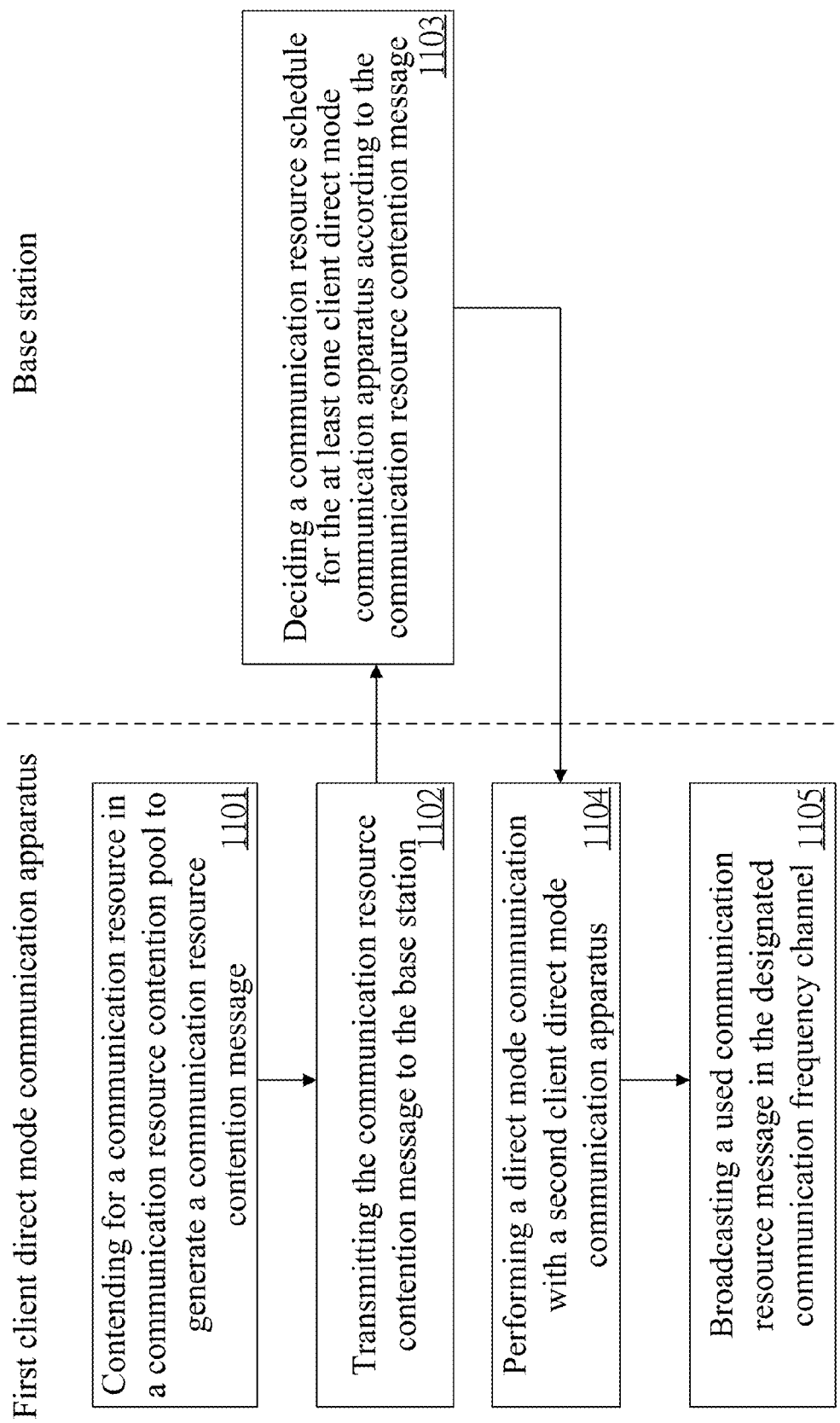
FIG. 11 is a flowchart diagram of a communication resource scheduling method according to an eleventh embodiment of the present invention.

An eleventh embodiment of the present invention is a communication resource scheduling method, a flowchart diagram of which is shown in FIG. 11. The method of the eleventh embodiment is used in a direct mode communication system (e.g., the direct mode communication system of any of the previous embodiments). The direct mode communication system comprises a base station and at least one client direct mode communication apparatus, and has a designated communication frequency channel. The at least one client direct mode communication apparatus includes a first client direct mode communication apparatus. Steps of the eleventh embodiment are detailed as follows.

Firstly, step 1101 is executed to enable the first client direct mode communication apparatus to contend for a communication resource in a communication resource contention pool to generate a communication resource contention message. Step 1102 is executed to enable the first client direct mode communication apparatus to transmit the communication resource contention message to the base station. Step 1103 is executed to enable the base station to decide a communication resource schedule for the at least one client direct mode communication apparatus according to the communication resource contention message.

Then, step 1104 is executed to enable the first client direct mode communication apparatus to perform a direct mode communication with a second client direct mode communication apparatus. Finally, step 1105 is executed to enable the first client direct mode communication apparatus to broadcast a used communication resource message in the designated communication frequency channel. The used communication resource message is configured to indicate the communication resource used by the first client direct mode communication apparatus to perform the direct mode communication with the second client direct mode communication apparatus.

It shall be particularly noted that, the used communication resource message may be: (1) a communication resource schedule obtained from the base station by the client direct mode communication apparatus after reporting the communication resource contention message; (2) a communication resource schedule of the client direct mode communication apparatus itself that succeeds in the contention; or (3) a communication resource schedule directly made by the base station, which is mainly used to inform other client direct mode communication apparatuses in the network of the used network resource(s) so that communication resource collisions can be avoided for the other client direct mode communication apparatuses.

According to the above descriptions, the direct mode communication system and the communication resource scheduling method thereof according to the present invention allocate and utilize the communication resources mainly according to the resource contention result reported so that direct mode communications can be accomplished optionally through scheduling by the base station or directly according to the contention result. In this way, the scheduling of communication resources can be remarkably improved, and meanwhile, the utilization efficiency of the spectrum resources can be significantly improved and the load of the base station can be decreased.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A communication resource scheduling method for a base station, the base station being used in a direct mode communication system, the direct mode communication system further comprising at least one client direct mode communication apparatus, and the at least one client direct mode communication apparatus comprising a first client direct mode communication apparatus, the communication resource scheduling method comprising:
   (a) the base station receiving a channel status message from the first client direct mode communication apparatus, wherein the channel status message is generated by the first client direct mode communication apparatus through performing a communication channel measurement, wherein the channel status message is used for reporting whether the first client direct mode communication apparatus obtains communication resource; and
   (b) the base station deciding a communication resource schedule of the at least one client direct mode communication apparatus according to the channel status message;
   wherein the communication resource schedule comprises:
      when the channel status message is used for reporting that the first client direct mode communication apparatus obtains communication resource, the base station allocates the communication resource used by the first client direct mode communication apparatus to a communication apparatus that is not adjacent to the first client direct mode communication apparatus; or
      when the channel status message is used for reporting that the first client direct mode communication apparatus does not obtain communication resource, the base station orthogonalizes communication resources unavailable for the first direct mode communication apparatus and allocates a part of the orthogonalized communication resources to the first client direct mode communication apparatus.

2. The communication resource scheduling method of claim 1, further comprising:
   (c) the base station receiving a scheduling request from the first client direct mode communication apparatus; and
   (d) the base station transmitting the communication resource schedule to the first client direct mode communication apparatus according to the scheduling request so that the first client direct mode communication apparatus performs a direct mode communication with a second client direct mode communication apparatus according to the communication resource schedule.

3. The communication resource scheduling method of claim 1, wherein the at least one client direct mode communication apparatus further comprises a second client direct mode communication apparatus which is not adjacent to the first client direct mode communication apparatus, the communication resource scheduling method further comprising:
   (c) the base station receiving a scheduling request from the second client direct mode communication apparatus; and
   (d) the base station transmitting the communication resource schedule to the second client direct mode communication apparatus according to the scheduling request so that the second client direct mode communication apparatus performs a direct mode communication with a third client direct mode communication apparatus according to the communication resource schedule.

4. The communication resource scheduling method of claim 1, wherein the direct mode communication system has a designated communication frequency channel, the communication resource scheduling method further comprising the following step after the step (b):
   (c) the base station transmitting an appended resource indication to the first client direct mode communication apparatus according to a channel usage status of the designated communication frequency channel so that the first client direct mode communication apparatus uses an appended communication resource in one of an unlicensed frequency channel and a licensed frequency channel according to the appended resource indication and communicates with the second client direct mode communication apparatus via the appended communication resource.

5. The communication resource scheduling method of claim 1, wherein the direct mode communication system has a designated communication frequency channel, the communication resource scheduling method further comprising the following steps after the step (b):
   (c) the base station receiving an additional communication resource request from the first client direct mode communication apparatus in the designated communication frequency channel; and
   (d) the base station transmitting an appended resource indication to the first client direct mode communication apparatus according to the additional communication resource request so that the first client direct mode communication apparatus uses an appended communication resource in one of an unlicensed frequency channel and a licensed frequency channel according to the appended resource indication and communicates with the second client direct mode communication apparatus via the appended communication resource.

6. The communication resource scheduling method of claim 1, wherein the channel status message is a communication resource contention message comprising a communication resource usage status, the communication resource scheduling method further comprising the following step after the step (b):
   (c) the base station re-adjusting a size of a communication resource contention pool according to the communication resource usage status of the communication resource contention message.

7. A base station for a direct mode communication system, the direct mode communication system further comprising at least one client direct mode communication apparatus, and the at least one client direct mode communication apparatus comprising a first client direct mode communication apparatus, the base station comprising:
   a transceiver, being configured to receive a channel status message from the first client direct mode communication apparatus, wherein the channel status message is generated by the first client direct mode communication apparatus through performing a communication channel measurement, wherein the channel status message is used for reporting whether the first client direct mode communication apparatus obtains communication resource; and a processor, being configured to decide a communication resource schedule of the at least one client direct mode communication apparatus according to the channel status message;

wherein the communication resource schedule comprises:
  when the channel status message is used for reporting that the first client direct mode communication apparatus obtains communication resource, the base station allocates the communication resource used by the first client direct mode communication apparatus to a communication apparatus that is not adjacent to the first client direct mode communication apparatus; or
  when the channel status message is used for reporting that the first client direct mode communication apparatus does not obtain communication resource, the base station orthogonalizes communication resources unavailable for the first direct mode communication apparatus and allocates a part of the orthogonalized communication resources to the first client direct mode communication apparatus.

8. The base station of claim 7, wherein the transceiver is further configured to receive a scheduling request from the first client direct mode communication apparatus, and the processor is further configured to transmit the communication resource schedule to the first client direct mode communication apparatus via the transceiver according to the scheduling request so that the first client direct mode communication apparatus performs a direct mode communication with a second client direct mode communication apparatus according to the communication resource schedule.

9. The base station of claim 7, wherein the at least one client direct mode communication apparatus further comprises a second client direct mode communication apparatus which is not adjacent to the first client direct mode communication apparatus, the transceiver is configured to receive a scheduling request from the second client direct mode communication apparatus, and the processor is configured to transmit the communication resource schedule to the second client direct mode communication apparatus via the transceiver according to the scheduling request so that the second client direct mode communication apparatus performs a direct mode communication with a third client direct mode communication apparatus according to the communication resource schedule.

10. The base station of claim 7, wherein the direct mode communication system has a designated communication frequency channel, the processor is further configured to transmit an appended resource indication to the first client direct mode communication apparatus according to a channel usage status of the designated communication frequency channel so that the first client direct mode communication apparatus uses an appended communication resource in one of an unlicensed frequency channel and a licensed frequency channel according to the appended resource indication and communicates with the second client direct mode communication apparatus via the appended communication resource.

11. The base station of claim 7, wherein the direct mode communication system has a designated communication frequency channel, the transceiver is further configured to receive an additional communication resource request from the first client direct mode communication apparatus in the designated communication frequency channel, and the processor is further configured to transmit an appended resource indication to the first client direct mode communication apparatus according to the additional communication resource request so that the first client direct mode communication apparatus uses an appended communication resource in one of an unlicensed frequency channel and a licensed frequency channel according to the appended resource indication and communicates with the second client direct mode communication apparatus via the appended communication resource.

12. The base station of claim 7, wherein the channel status message is a communication resource contention message comprising a communication resource usage status, and the processor is further configured to re-adjust a size of a communication resource contention pool according to the communication resource usage status of the communication resource contention message.

13. A communication resource scheduling method for a first client direct mode communication apparatus, the first client direct mode communication apparatus being used in a direct mode communication system, and the direct mode communication system further comprising a base station, the communication resource scheduling method comprising:
  (a) the first client direct mode communication apparatus performing a communication channel measurement so as to generate a channel status message, wherein the channel status message is used for reporting whether the first client direct mode communication apparatus obtains communication resource; and
  (b) the first client direct mode communication apparatus transmitting the channel status message to the base station so that the base station decides a communication resource schedule of at least one client direct mode communication apparatus of the direct mode communication system according to the channel status message;

wherein the communication resource schedule comprises:
  when the channel status message is used for reporting that the first client direct mode communication apparatus obtains communication resource, the base station allocates the communication resource used by the first client direct mode communication apparatus to a communication apparatus that is not adjacent to the first client direct mode communication apparatus; or
  when the channel status message is used for reporting that the first client direct mode communication apparatus does not obtain communication resource, the base station orthogonalizes communication resources unavailable for the first direct mode communication apparatus and allocates a part of the orthogonalized communication resources to the first client direct mode communication apparatus.

14. The communication resource scheduling method of claim 13, further comprising:
  (c) the first client direct mode communication apparatus transmitting a scheduling request to the base station;
  (d) the first client direct mode communication apparatus receiving the communication resource schedule from the base station after the step (c); and
  (e) the first client direct mode communication apparatus performing a direct mode communication with a second client direct mode communication apparatus according to the communication resource schedule.

15. The communication resource scheduling method of claim 13, further comprising:

(c) the first client direct mode communication apparatus performing a direct mode communication with a second client direct mode communication apparatus.

16. The communication resource scheduling method of claim 15, wherein the direct mode communication system has a designated communication frequency channel, the communication resource scheduling method further comprising the following steps after the step (c):
(d) the first client direct mode communication apparatus receiving an appended resource indication from the base station in the designated communication frequency channel;
(e) the first client direct mode communication apparatus using an appended communication resource in one of an unlicensed frequency channel and a licensed frequency channel according to the appended resource indication; and
(f) the first client direct mode communication apparatus communicating with the second client direct mode communication apparatus via the appended communication resource.

17. The communication resource scheduling method of claim 15, wherein the direct mode communication system has a designated communication frequency channel, the communication resource scheduling method further comprising the following steps after the step (c):
(d) the first client direct mode communication apparatus transmitting an additional communication resource request to the base station in the designated communication frequency channel;
(e) the first client direct mode communication apparatus receiving an appended resource indication from the base station after the step (d);
(f) the first client direct mode communication apparatus using an appended communication resource in one of an unlicensed frequency channel and a licensed frequency channel according to the appended resource indication; and
(g) the first client direct mode communication apparatus communicating with the second client direct mode communication apparatus via the appended communication resource.

18. The communication resource scheduling method of claim 15, wherein the direct mode communication system has a designated communication frequency channel, the communication resource scheduling method further comprising the following step after the step (c):
(d) the first client direct mode communication apparatus broadcasting a used communication resource message in the designated communication frequency channel, wherein the used communication resource message is configured to indicate a communication resource used by the first client direct mode communication apparatus to perform the direct mode communication with the second client direct mode communication apparatus.

19. The communication resource scheduling method of claim 13, wherein the communication channel measurement is one of a communication resource contention measurement and a channel sensing measurement.

20. A first client direct mode communication apparatus for a direct mode communication system, the direct mode communication system further comprising a base station, the first client direct mode communication apparatus comprising:
a processor, being configured to perform a communication channel measurement so as to generate a channel status message, wherein the channel status message is used for reporting whether the first client direct mode communication apparatus obtains communication resource; and
a transceiver, being configured to transmit the channel status message to the base station so that the base station decides a communication resource schedule of at least one client direct mode communication apparatus of the direct mode communication system according to the channel status message;
wherein the communication resource schedule comprises:
when the channel status message is used for reporting that the first client direct mode communication apparatus obtains communication resource, the base station allocates the communication resource used by the first client direct mode communication apparatus to a communication apparatus that is not adjacent to the first client direct mode communication apparatus; or
when the channel status message is used for reporting that the first client direct mode communication apparatus does not obtain communication resource, the base station orthogonalizes communication resources unavailable for the first direct mode communication apparatus and allocates a part of the orthogonalized communication resources to the first client direct mode communication apparatus.

21. The first client direct mode communication apparatus of claim 20, wherein the transceiver is further configured to transmit a scheduling request to the base station and receive the communication resource schedule from the base station, and the processor is further configured to perform a direct mode communication with a second client direct mode communication apparatus according to the communication resource schedule.

22. The first client direct mode communication apparatus of claim 20, wherein the processor is further configured to perform a direct mode communication with a second client direct mode communication apparatus via the transceiver.

23. The first client direct mode communication apparatus of claim 22, wherein the direct mode communication system has a designated communication frequency channel, the transceiver is further configured to receive an appended resource indication from the base station in the designated communication frequency channel, and the processor is further configured to use an appended communication resource in one of an unlicensed frequency channel and a licensed frequency channel according to the appended resource indication, and communicate with the second client direct mode communication apparatus via the appended communication resource and via the transceiver.

24. The first client direct mode communication apparatus of claim 22, wherein the direct mode communication system has a designated communication frequency channel, the transceiver is further configured to transmit an additional communication resource request to the base station in the designated communication frequency channel and receive an appended resource indication from the base station, and the processor is further configured to use an appended communication resource in one of an unlicensed frequency channel and a licensed frequency channel according to the appended resource indication, and communicate with the second client direct mode communication apparatus via the appended communication resource and via the transceiver.

25. The first client direct mode communication apparatus of claim 22, wherein the direct mode communication system has a designated communication frequency channel, the transceiver is further configured to broadcast a used communication resource message in the designated communication frequency channel, wherein the used communication resource message is configured to indicate a communication resource used by the first client direct mode communication apparatus to perform the direct mode communication with the second client direct mode communication apparatus.

26. The first client direct mode communication apparatus of claim 20, wherein the communication channel measurement is one of a communication resource contention measurement and a channel sensing measurement.

* * * * *